Nov. 28, 1944. B. A. PETERSON 2,363,988
WINDER
Filed Aug. 12, 1942
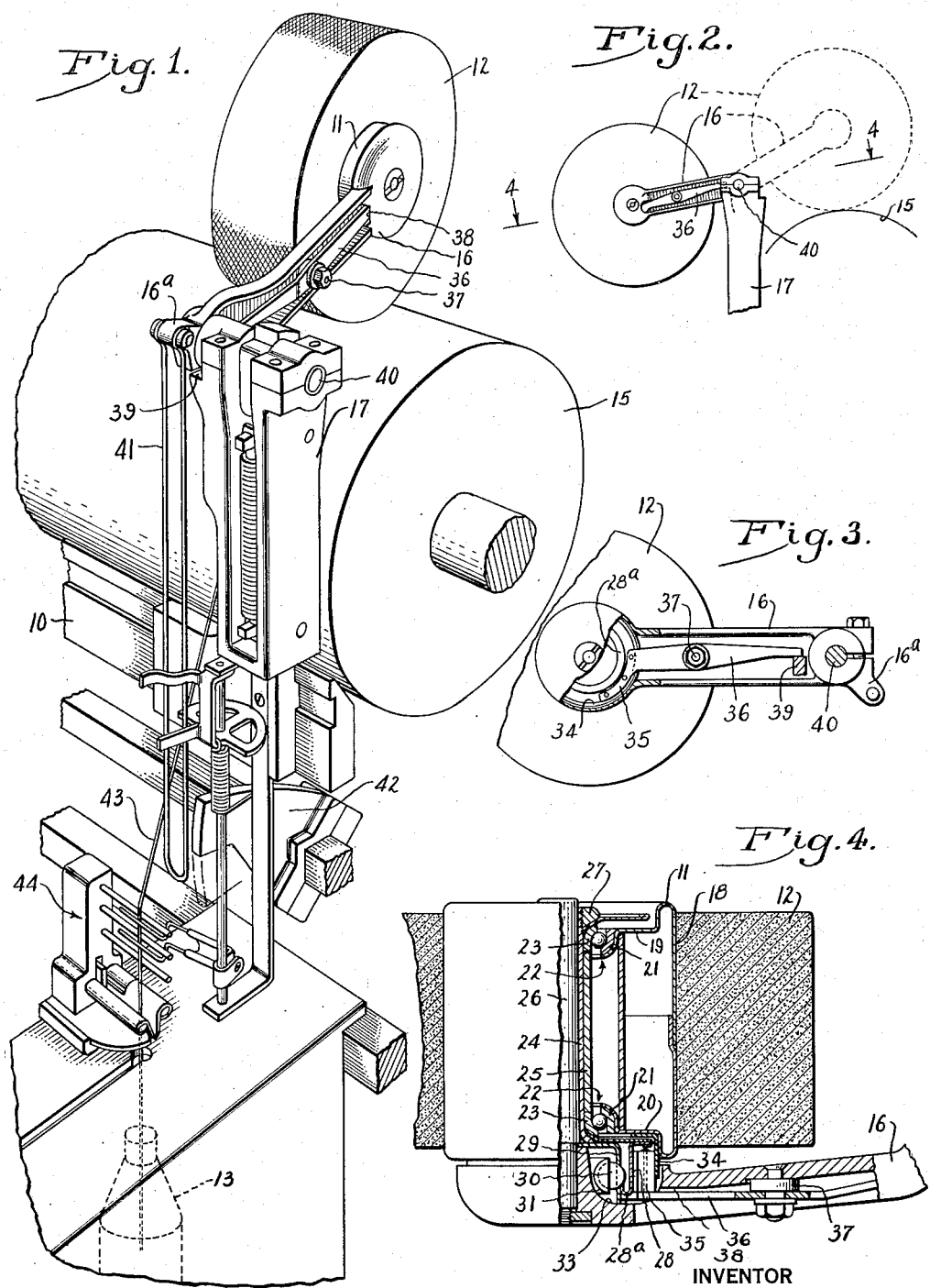
INVENTOR
Burt A. Peterson
BY
ATTORNEYS Patented Nov. 28, 1944

2,363,988

UNITED STATES PATENT OFFICE 2,363,988

WINDER

Burt A. Peterson, Rockford, Ill., assignor to Barber-Colman Company, Rockford, Ill., a corporation of Illinois Application August 12, 1942, Serial No. 454,521

12 Claims. (Cl. 242—37)

The invention relates in general to winders or automatic spoolers and more particularly to an improved cheese-core braking system therefor. For an understanding of the general type of winding or spooling machine to which the improvements herein disclosed relate, reference may be had to Patent No. 1,267,977 issued May 28, 1918, to Howard D. Colman.

The general object of the present invention is to provide in a winding machine a new and improved brake mechanism for a cheese core, which is operative automatically as an incident to the shifting of the cheese into an idle position with respect to an associated actuating drum.

A further object is to provide a brake mechanism for cheeses which is extremely simple in construction and yet effectual in operation.

Another object is to provide a brake mechanism of the character indicated in which the movement of the cheese supporting arm into a position in which it is disassociated from the actuating drum is utilized to stop the rotation of the cheese.

Still another object is to provide a cheese brake mechanism for winders in which the braking force supplied to a cheese shifted from running to idle position is proportional to the weight of the cheese.

A further object is to provide a brake device for cheeses which is actuated by gravity so as to continue to be effective in the thrown-out position of the cheese.

The objects of the invention thus generally stated, together with other and ancillary advantages, are attained by the construction and arrangement shown by way of illustration in the accompanying drawing wherein:

Figure 1 is a fragmentary perspective view of a winder embodying my invention.

Fig. 2 is a detailed view on a small scale illustrating the operation of the brake mechanism in the swinging movement of the cheese supporting arm.

Fig. 3 is a view somewhat similar to Fig. 2, but with parts broken away and on a larger scale to show the mode of applying the brake.

Fig. 4 is a fragmentary sectional view taken approximately in the plane of line 4 of Fig. 2.

For purposes of illustration and explanation of its various novel features, the invention has been shown herein as embodied in an automatic spooler or winding machine, a portion of which appears in Fig. 1. The machine is of the general type disclosed in said Patent No. 1,267,977 noted above and comprises in general a series of winding units arranged in closely spaced relation along a frame 10.

The several winding units are substantially identical in construction and, accordingly, a description of one will serve for all. Each of these units comprises a rotatable cheese core 11 on which a cheese or package of yarn 12 is wound from a supply bobbin 13. The cheese is rotated through frictional contact with the periphery of a winding drum 15 which may be continuously driven from any suitable source of power.

The cheese core 11 is rotatably mounted on the end of a swinging arm 16 pivoted on an upright bracket 17 on the machine frame 10. When the cheese 12 is in its winding position (shown in full lines in Fig. 1 and in broken lines in Fig. 2) gravity holds it in contact with the revolving winding drum 15. From this position the cheese is swung automatically into an idle or "thrown-out" position (Figs. 2 and 3). This occurs upon the completion of the cheese, or upon a failure of the yarn supply prior to the completion of the cheese.

The present invention is concerned in general with the provision of an improved brake mechanism operative as an incident to the shifting of the cheese from its winding position to its idle position to bring the cheese to rest and thereby prevent an objectionable whipping of the trailing end of the strand attached to the cheese.

More particularly, the improved brake mechanism is designed for use in winders of the type disclosed in the aforesaid patent to Colman in which the cheese, after having been lifted by the throw-out means and swung past dead center, moves by the force of gravity into its thrown-out position. The braking force necessary to be applied to stop the thrown-out cheese within a given time increases with the size or weight of the cheese. Accordingly, the present invention provides a brake mechanism which is gravity actuated so that the applied braking force not only increases with the weight of the cheese but continues to be effective so as to bring the cheese to rest.

In accomplishing these results, I provide an extremely simple mechanism utilizing to advantage the movement of the swinging arm in the throw-out motion of the cheese. Thus I provide a brake element herein in the form of a shoe, forced into engagement with an annular braking surface rigid with the core by means including a lever pivoted on the arm and actuated at a predetermined point in the movement of the arm.

The cheese core 11 is of the type shown and described in Patent No. 1,641,661 issued September 6, 1927, to Howard D. Colman and therefore need not be described in detail. Briefly, it comprises a sheet metal body having a relatively wide peripheral surface 18 upon which the yarn mass constituting the cheese is wound. Inwardly offset end walls 19 and 20 support the outer raceways 21 of ball bearings generally designated 22. The inner raceways 23 of the bearings are mounted at the ends of an inner sleeve 24 with a spacer ring 25 between them, and these several parts are secured together by a nut 27.

The core 11 is removably mounted upon a shaft 26 suitably secured to the free end of the cheese supporting arm 16 and projecting from one side thereof, the inner sleeve 24 being loose on the shaft. To retain the core releasably upon the shaft 26, the sleeve 24 has rigid with the end adjacent the arm a sheet metal annulus comprising a flange 28, and concentric therewith and fixed to the arm 16 is an annular flange 29. The latter is apertured to receive a pair of retaining balls 30 (one only being shown herein) which are yieldably held by a grooved split ring 31 in engagement with a reversely bent end 28ᵃ of the flange 28.

The cheese supporting arm, as herein shown, is channel-shaped in cross section with the channel opening outwardly away from the cheese. To receive the retaining means for the core, the free end of the arm is constructed to provide an annular recess 33. This recess has an external diameter slightly greater than the flange 28 so as to receive a guard ring 34 rigid with the core. The guard ring bridges the gap between the core and the arm and serves to prevent the entry of loose thread ends.

The guard ring 34 is concentric with but spaced radially outward from the flange 28, and I utilize the space thus provided to receive a brake member for cooperation with one of the two annular surfaces defining said space. In the present instance the movable braking element is in the form of an arcuate shoe 35 fixed upon a lever 36 pivoted midway between its end on the arm 16 as indicated at 37. The lever 36 is disposed within the channel of the arm 16 and its inner end projects through a suitable passage 38 into the annular recess 33.

When the cheese is shifted from its winding to its idle position as illustrated in Fig. 2, the end of the lever 36 opposite the brake shoe engages with a stationary stop in the form of a laterally projecting lug 39 rigid with the main supporting bracket 17. The lug 39 is disposed adjacent the pivotal axis 40 of the arm 16, and the arrangement is such that in the approach of the arm to its thrown-out position the lever engages the lug and is swung in a direction to move the brake shoe 35 outwardly against the internal surface of the guard ring 34. The latter thus performs the additional function of providing an internal braking surface.

The particular means for automatically swinging the cheese from its winding to its idle position is of the character set forth in said Colman Patent No. 1,266,977. As shown, it comprises a bail 41 pivotally connected to a short crank arm 16ᵃ rigid with the arm 16 and arranged when swung rearwardly to be engaged by an oscillating hook 42. The bail is normally held in its outward position free of the hook by means of the running strand 43 and is permitted to swing into the path of the hook in response to the operation of a broken-thread detector 44.

It will be observed that by the construction and arrangement set forth, the braking force applied to bring a thrown out cheese to rest is derived from the action of gravity upon the cheese and its supporting arm after the latter has been swung by the throw-out means beyond dead center position. Thus not only does the braking force initially applied vary with the weight of the cheese but likewise the continued force necessary to stop the rotational movement. At the same time the brake device which I have provided is of an extremely simple character so that no appreciable increase in the cost of the winder is involved. This is particularly true because of the use of part of the cheese core to provide a part of the brake and further because of the manner in which the brake actuating lever is arranged for actuation with the cheese supporting arm.

I claim as my invention:

1. In a winder, the combination of a rotatable cheese core, a driving drum, a pivoted arm swingably supporting said core for movement from a winding position above the drum to an idle position substantially to one side of the drum, a brake device operatively associated with said core and including a shiftable brake element, throw-out means operable to swing said arm to carry said cheese from its winding position to said idle position, an actuating member for said brake element, and a stop coacting with said member in the swinging movement of said arm by said throw-out means to render said brake element effective to stop said core.

2. In a winder, the combination of a rotatable cheese core, a driving drum for engagement by the yarn mass on said core, an arm supporting said core for movement from a winding position above the drum to an idle position substantially removed from the drum, a brake device operatively associated with one end of said core and including a shiftable brake element, throw-out means operable upon said arm to carry said cheese from its winding position to its idle position, and means operable in the approach of the arm to said idle position to actuate said shiftable brake element.

3. In a winder, the combination of a pivoted supporting arm, a cheese core rotatably mounted on the free end of said arm and having a member at the end thereof adjacent the arm providing an annular braking surface, a shiftable braking element for coaction with said surface, throw-out means operable to swing said arm and cheese core out of winding position, and means for actuating said shiftable brake element including a lever pivoted on said arm and a stop member engageable by said lever in the swinging movement of the arm.

4. In a winder, the combination of a pivoted supporting arm, a cheese core rotatably mounted on the free end of said arm and having a member at the end thereof adjacent said arm providing an annular braking surface, a shiftable braking element for coaction with said surface, throw-out means operable to swing said arm and cheese core out of winding position, and means for actuating said shiftable brake element including a lever operative as an incident to the approach of said arm to its thrown-out position.

5. In a winder, the combination of a rotatable cheese core, means including a pivoted arm for supporting said core, throw-out means operable to swing said arm into and out of winding position, said core having a member rigid therewith providing an annular braking surface, a lever pivoted on said arm and carrying a brake shoe for coaction with said surface, and stop means engaged by said lever in the thrown-out position of the core and operative through said lever to apply said shoe to said surface.

6. In a winder, the combination of a pivoted supporting arm, a cheese core rotatably mounted on the free end of said arm with one end of the core adjacent one side of the arm, means for releasably retaining the core on the arm including an annulus rigid with the core and a coacting member carried by said arm, a guard ring also carried by said core, said annulus and said guard ring providing radially spaced annular surfaces, and brake means including a shiftable element disposed between said surfaces and arranged for coaction with one of them to interrupt the rotation of the core.

7. In a winder, the combination of a pivoted supporting arm, a cheese core rotatably mounted on the free end of said arm with one end of the core adjacent one side of the arm, means for releasably retaining the core on the arm including an annulus rigid with the core and projecting axially outward therefrom, said arm having an annular recess for receiving said annulus, a guard ring also carried by said core and projecting into said recess, said annulus and said guard ring providing radially spaced annular surfaces, and brake means including a shiftable element disposed between said surfaces and arranged for coaction with one of them to interrupt the rotation of the core.

8. A winder having, in combination, a swingably mounted cheese supporting arm, a shaft projecting from the free end of said arm at one side thereof, a cheese core rotatably mounted on said shaft with one end disposed adjacent to one side of the arm and said arm having an annular recess in the face adjacent the core, an annular member rigid with the core and projecting into said recess, said annular member providing an annular braking surface, a shiftable brake element operatively associated with said member for coaction with said surface, and means including a lever mounted on said arm for actuating said brake element as an incident to the swinging movement of the arm.

9. In a winder the combination of a stationary support, an arm pivotally mounted on said support, a shaft carried by the free end of said arm, a cheese core rotatably mounted on said shaft at one side of the arm and having an annular member rigid therewith, a lever mounted on the arm on the opposite side thereof, said arm having an opening therein for the passage of one end of the lever, a brake shoe on said one end of the lever for coaction with said annular member, and a stop on said support engageable by the opposite end of said lever in the movement of the arm from the winding position to a thrown-out position whereby to actuate said brake shoe.

10. In a winder, the combination of a stationary support, an arm pivotally mounted on said support, a shaft carried by the free end of said arm, a cheese core rotatably mounted on said shaft at one side of the arm, said arm having an annular recess on the side adjacent said core, said core having an annular member rigid therewith and projecting into said recess, a lever mounted on the arm on the opposite side thereof, said arm having an opening therein for the passage of one end of the lever into said recess, a brake shoe on said lever within said recess, and a stop on said support engageable by the opposite end of said lever in the movement of the arm from the winding position to a thrown-out position whereby to move said brake shoe into engagement with said annular member on the core.

11. In a winder, the combination of a rotatable cheese core, a driving drum mounted for rotation upon a horizontal axis, an arm pivoted in laterally offset relation to said drum and swingably supporting said core with a cheese being wound thereon in running contact with said drum, throw-out means operable to swing out said arm to carry said cheese from its winding position to an idle position at one side of the drum, said arm moving into the thrown-out position of the cheese by the action of gravity, and brake means for stopping rotation of the thrown-out cheese including a shiftable brake element operatively associated with the cheese core and an actuating member operable in the latter portion of the movement of the arm by said throw-out means to apply a braking force to said element varying according to the weight of the cheese.

12. A winder having a cheese driving drum rotatable on a horizontal axis, a rotatable cheese core, a support for said core, means for shifting said support to carry it together with a cheese being wound from a normal position in running contact with said drum to an idle position at one side of the drum, said support and its cheese moving by the action of gravity into said idle position, and a brake mechanism for stopping rotation of the core in the thrown-out position thereof, including a brake element coacting with the core and actuating means for said brake element operative as an incident to the movement of the support into said idle position to apply a braking force to the core proportional to the weight of the cheese thereon.

BURT A. PETERSON.